US008581214B2

(12) United States Patent  
Hoornaert

(10) Patent No.: US 8,581,214 B2
(45) Date of Patent: Nov. 12, 2013

(54) STAFF DOSE AWARENESS INDICATION

(75) Inventor: Bart Pierre Antoine Jozef Hoornaert, Arendonk (BE)

(73) Assignee: Koninklijke Philips N.V., Eindhoven (NL)

( * ) Notice: Subject to any disclaimer, the term of this patent is extended or adjusted under 35 U.S.C. 154(b) by 594 days.

(21) Appl. No.: 12/599,120

(22) PCT Filed: Apr. 29, 2008

(86) PCT No.: PCT/IB2008/051653
§ 371 (c)(1),
(2), (4) Date: Aug. 25, 2010

(87) PCT Pub. No.: WO2008/135906
PCT Pub. Date: Nov. 13, 2008

(65) Prior Publication Data
US 2010/0310048 A1    Dec. 9, 2010

(30) Foreign Application Priority Data
May 7, 2007 (EP) .................................... 07107603

(51) Int. Cl.
G01T 5/10 (2006.01)
G01T 1/02 (2006.01)

(52) U.S. Cl.
USPC .................................. 250/482.1; 250/482.5

(58) Field of Classification Search
USPC .......................................... 250/482.1, 484.5
See application file for complete search history.

(56) References Cited

U.S. PATENT DOCUMENTS

| 4,484,076 A | 11/1984 | Thomson |
| 4,642,463 A | 2/1987 | Thoms |
| 4,733,383 A * | 3/1988 | Waterbury ..................... 368/10 |
| 5,099,127 A | 3/1992 | Kitaguchi et al. |
| 5,661,310 A * | 8/1997 | Jones ............................ 250/584 |
| 6,031,454 A | 2/2000 | Lovejoy et al. |
| 6,442,238 B2 * | 8/2002 | Meulenbrugge ............. 378/98.8 |
| 6,650,930 B2 * | 11/2003 | Ding ............................. 600/436 |
| 7,356,123 B2 * | 4/2008 | Mollus ......................... 378/147 |
| 2002/0040968 A1 * | 4/2002 | Black et al. ................... 250/393 |
| 2002/0195572 A1 | 12/2002 | Kitaguchi et al. |
| 2005/0010110 A1 * | 1/2005 | Black et al. .................. 600/436 |
| 2005/0242289 A1 | 11/2005 | Grichnik et al. |
| 2006/0153341 A1 * | 7/2006 | Guyonnet et al. ............ 378/207 |
| 2007/0075251 A1 * | 4/2007 | Doughty et al. .......... 250/370.01 |

FOREIGN PATENT DOCUMENTS

| GB | 2364120 A | 1/2002 |
| JP | 2000137079 A | 5/2000 |
| WO | WO 2007080522 A1 * | 7/2007 |

OTHER PUBLICATIONS

Chugh et al., "A Computer-Graphic Display for Real-Time Operator Feedback During Interventional X-Ray Procedures," Proc. SPIE 5367, Medical Imaging 2004: Visualization, Image-Guided Procedures, and Display, p. 464-473.*

Baiter, Stephen, "Methods for Measuring Fluoroscopic Skin Dose," Pediatr Radiol (2006) 36 (Suppl 2): 136-140.*

(Continued)

Primary Examiner — Casey Bryant

(57) ABSTRACT

According to an exemplary embodiment of the invention a dose awareness indication device is provided in which an individual dose is determined on the basis of raw dose measuring data, dose sensor and information data from an examination apparatus, wherein the information data from the examination apparatus relates to the type of examination. Thus, an individualized determination of dose data may be provided, depending on the actual examination process.

12 Claims, 4 Drawing Sheets

(56) References Cited

OTHER PUBLICATIONS

Teeuwisse et al: "Patient and Staff Dose During CT Guided Biopsy, Drainage and Coagulation"; The British Journal of Radiology, vol. 74, 2001, pp. 720-726.

Faulkner et al: "Estimation of Effective Dose Equivalent to Staff in Diagnostic Radiology"; Physics in Medicine and Biology, 1988, vol. 33, No. 1, pp. 83-91.

* cited by examiner

STAFF DOSE AWARENESS INDICATION

The invention relates to the field of measurement of X-ray radiation. In particular, the invention relates to a dose awareness indication device for determining an individual dose data of a staff member during a type of diagnostic or interventional X-ray examination of an object of interest with an examination apparatus, a system for determining an individual dose data, a method, a program element and a computer-readable medium.

In a catheter laboratory (cath lab), where radiation exposures are used for diagnostic and interventional medical X-ray examinations the personnel has to wear dose-monitoring badges. These badges, which may be adapted in the form of thermal luminescent dosimeters (TLD) measure the cumulative individual staff dose. A monthly read-out is used to check if the legally set annual threshold limits are not exceeded.

The staff dose may be expressed in terms of equivalent dose, and may be referenced with the symbol Hp and the units sievert (Sv).

For an X-ray apparatus in general, but specifically for the special cardio-vascular equipment, the amount of staff dose may vary over an order of magnitude between cases or even within a single case (i.e. one single examination process).

This is due to variations in for example the thickness of the patient or in variations in applications or clinical tasks. The amount of staff dose may vary over several orders of magnitude depending on the clinical task or imaging technique used. (Such Imaging techniques are: Fluoro cardio, Fluoro vascular, Fluoro Electrophysiology, Fluoro low, Fluoro normal, Fluoro high, cine exposures at 15 fr/s, cine exposures at 30 fr/s, at 60 fr/s, DSA (digital subtraction angiography, . . . ). But even for a given patient and a given clinical task, the way the system is used and the way the user positions him, herself and/or positions the gantry (and therefore the X-ray path in space) will effect the staff dose in a large amount (one order of magnitude).

Today users have only a rough idea about their monthly average. They usually get no feedback at all and they are not aware whether they use the apparatus in a sensible way or not. Users do not get indication if they are exposed to an unnecessarily high dose rate for a given time, even only for specific situations.

It would be desirable to have an improved staff dose awareness indication.

The invention provides a dose awareness indication device, a system for determining an individual dose data, a method, a program element and a computer-readable medium with the features according to the independent claims.

It should be noted that the following described exemplary embodiments of the invention apply also for the system, the method, the computer-readable medium and the program element.

According to a first aspect of the present invention, a dose awareness indication device for determining an individual dose data of a staff member during a type of diagnostic or interventional x-ray examination of an object of interest (such as a patient or in case of baggage inspection an item of luggage) with an examination apparatus is provided, the device comprising a determination unit for determining the individual dose data on the basis of raw dose measuring data from a dose sensor and information data from the examination apparatus, wherein the information data from the examination apparatus relates to the type of examination.

In other words, a combination of the raw measurements of staff dose or staff dose rates with information known by the X-ray apparatus (between others the intended clinical task) is performed. This combination results in an indication of the individual dose or dose rate which makes the user (staff) aware if the actual received dose is having the level which can be expected or not.

According to another exemplary embodiment of the present invention, the determination unit is further adapted for performing a normalization of the individual dose data on the basis of an inventory of good clinical practice. The inventory of good clinical practice for example comprises good practice values of the particular examination procedure (examination task) which is performed.

In other words, a link is provided between the staff dose and the particular examination mode (clinical task) which for example comprises the patient dose used for the particular invention examination. Thus, even if for a given patient a frontal or a lateral projection results in about the same patient dose (air kerma and/or DAP) for a given clinical program, the clinical staff may be subject to X-rays having a dose differing by more than an order of magnitude. This may be due via the nature of the X-rays in combination with backscatter and absorption processes.

However, since, according to the invention, a normalization on the basis of "good practice" and/or on the basis of the clinical task specific technical X-ray apparatus settings is performed, the quality of working in terms of staff dose safety may be displayed rather than giving "raw" numbers.

According to another exemplary embodiment of the present invention, the determination of the individual dose data is performed in real-time.

This may provide for a tracking of the actual staff dose absorbed by a member of the staff during the examination.

According to another exemplary embodiment of the present invention, the device further comprises a display for visualizing the individual dose data.

Thus, the staff member can, at every time, monitor his/her individual dose or dose rate.

According to another exemplary embodiment of the present invention, the device is further adapted for automatically determining the individual dose data when the dose sensor is one of activated or within a predetermined range from the device.

Thus, when for example, during an examination, a new staff member enters the examination room, he/she will be noticed by the device and added to the list of people to be tracked.

According to another exemplary embodiment of the present invention, a measurement frequency of the dose sensor is automatically set on the basis of the type of examination.

In other words, if for example an examination is performed which only lasts for a couple of seconds, the measurement frequency is high, so that a plurality of dose measurements can be taken during the examination. If, on the other hand, the treatment or examination lasts for several hours, the measurement frequency of the dose sensor may be automatically set to a lower frequency, for example in the order of 1 per minute.

According to another exemplary embodiment of the present invention, a threshold value is automatically set on the basis of the type of examination, wherein the device is further adapted for triggering an alarm if the individual dose data exceeds the threshold value.

Therefore, according to this exemplary embodiment of the present invention, the staff member can be warned if a predefined maximum dose or a predefined maximum dose rate is exceeded.

According to another aspect of the present invention, a system for determining an individual dose data of a staff member during a type of diagnostic or interventional x-ray examination of an object of interest with an examination apparatus is provided, the system comprising a dose sensor for measuring a dose, resulting in raw dose measuring data, and a dose awareness indication device with a determination unit for determining the individual dose data on the basis of the raw dose measuring data and information data from the examination apparatus, wherein the information data from the examination apparatus relates to the type of examination.

Furthermore, a method for determining an individual dose data of a staff member during a type of diagnostic or interventional x-ray examination of an object of interest with an examination apparatus is provided, in which the individual dose data is determined on the basis of raw dose measuring data from a dose sensor and information data from the examination apparatus, wherein the information data from the examination apparatus relates to the type of examination.

Furthermore, according to another exemplary embodiment of the present invention, a program element for determining an individual dose data of a staff member during a type of diagnostic or interventional x-ray examination of an object of interest with an examination apparatus is provided which, when being executed by a processor, causes the processor to carry out the above-mentioned method step.

Furthermore, a computer-readable medium is provided, in which a computer program for determining an individual dose data of a staff member during a type of diagnostic or interventional x-ray examination of an object of interest with an examination apparatus is stored which, when being executed by a processor, causes the processor to carry out the above-mentioned method step.

It may be seen as the gist of an exemplary embodiment of the present invention, that real-time dose or dose rate information is displayed which is individualized on the basis of raw dose measuring data and information data from the examination apparatus. In that way, the display may make the user aware if the actual received dose is having the level which can be expected.

These and other aspects of the present invention will become apparent from and elucidated with reference to the embodiments described hereinafter.

Exemplary embodiments of the present invention will now be described in the following, with reference to the following drawings.

The illustration in the drawings is schematically. In different drawings, similar or identical elements are provided with the same reference numerals.

Figure 1:
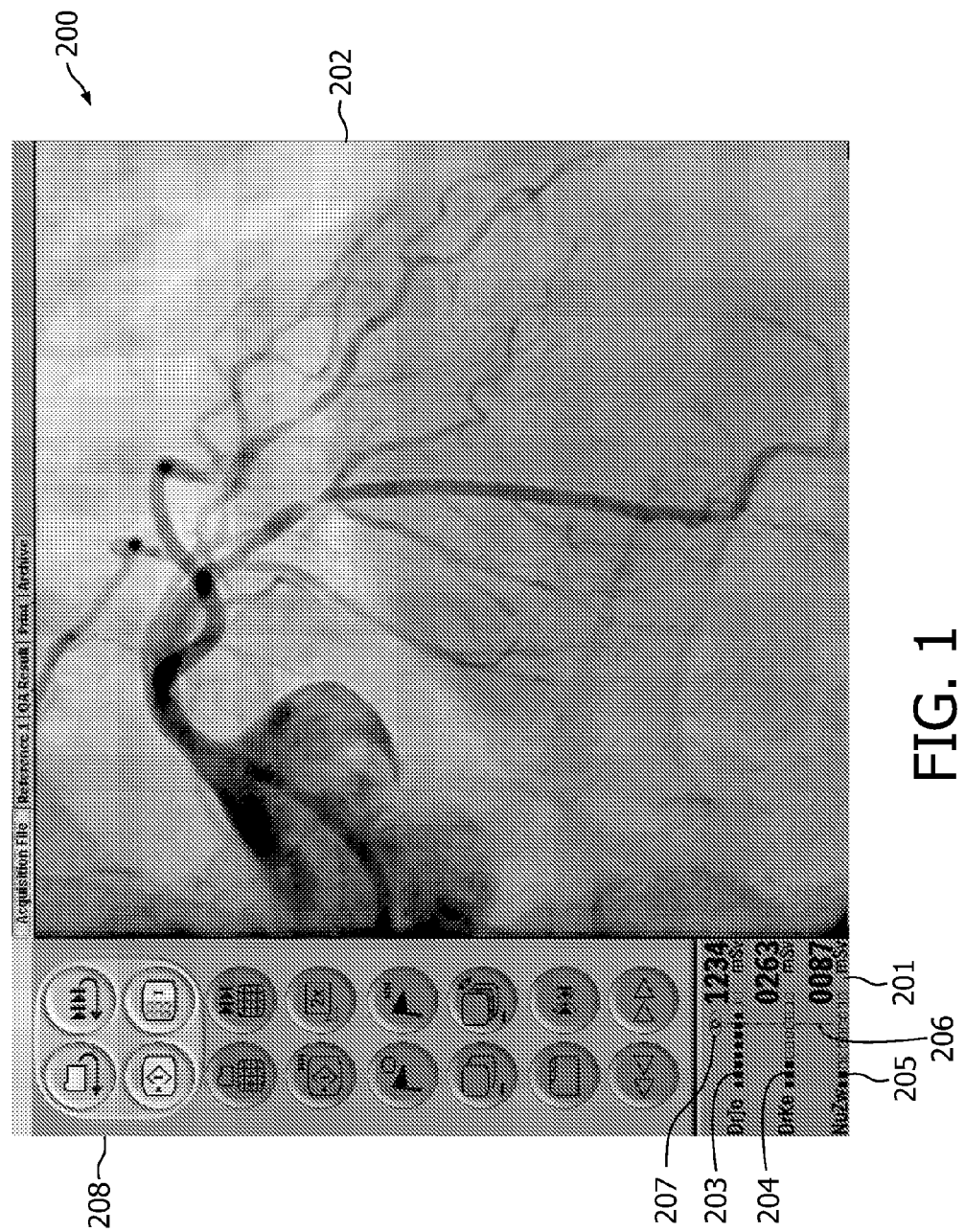
FIG. 1 shows a schematic representation of a display for visualizing the individual dose data according to an exemplary embodiment of the present invention.

The system according to the invention may comprise a real-time personal dose meter or dose sensor 401 (see FIG. 4). the dose sensor is adapted to give the customer the possibility to get their accumulated dose at any moment (for instance end of the day).

The dose sensor may comprise a wireless data transmission 402, and will sent its information to a base station or dose awareness indication device 403. That base station 403 may be placed in the examination room.

The base station is linked to en examination apparatus 410, such as an X-ray system (sometimes called the Xper system). This provides the possibility to display the cumulative dose values on an Xper display. As the dose readout will be done at about once pro second, one could even derive a (rough) indication of the actual staff dose rate. The units are for example Sievert/hour [Sv/h].

Because the indications may vary over several orders of magnitude, the interpretation of these numbers by physicians and technicians is not obvious. (It may not even be obvious for trained physicists neither).

Rather than displaying equivalent dose rates in plain numbers [Sv/h], a more user-friendly indication may contribute to the awareness of the user in matters like "how dose conscious am I really working?"

According to an aspect of the invention, relative scales are used, by showing how the actual staff dose rate relates to what could be expected in terms of good-practise, for the given clinical task, related to colleagues, related to the selected functional freedom/program selection offered by the system.

The measured equivalent dose rates will be referenced with values to be expected for the given clinical task.

Clinical tasks may be: cardio fluoro, vascular fluoro, paediatric fluoro, EP fluoro, cardiac exposures, vascular DSA exposures, rotational scans, . . . (a state-of-the-art cardio-vascular system may know 15 distinctive clinical tasks). It should be noted that the present invention may also be applied to other X-ray apparatus than cardio-vascular.

For cardio fluoro another reference may be used as for cardiac cine exposures. A user working with the same dose consciousness (same one step backwards, same good use of shielding glasses, . . . ) will get a similar indication on the Staff Dose Awareness display for both techniques, even when in absolute terms the values may differ a factor 5 or 10.

Another example: using (very low dose) E.P. fluoro should drop the expected staff dose with another order of magnitude. However, a user who pays insufficient attention to good-working practise (for examplke by not stepping backwards, or by not wearing shielding glasses), will have a relatively low dose rate. But because the expected X-ray on time may be extremely long (up to 200 min), it still make sense to make him aware that his behaviour is too high compared to 'good practise".

Furthermore, excessive values can be indicated by additional warnings. Warnings levels (thresholds), which correspond to the task performed may be used instead of absolute warning levels. Absolute warning levels, like buzzers or other signals will always be linked with high-dose clinical tasks, such as exposures. Therefore, an intrinsic low dose application like EP fluoro will not be linked with an absolute warning.

The normalisation with respect of the clinical task which is performed may also include an inventory of good clinical practise. These values may be programmable in the system. In this case, the reference of 'good practise' may be adapted in the X-ray apparatus, for each clinical task separately. It may be appreciated for very dose conscious group of users, which want to be warned earlier. It may also be set differently for individual users. Dr's (i.e. physicians) in training may receive different normalisation values and warning indications compared to experienced specialists which have to do the difficult situations only.

Some countries/regions/hospitals advice is to wear the dose meter above the lead apron, others advise to wear below, and in some cases the double meter technique is advised.

The measurement data are typically expressed as equivalent dose(rate) Hp; these data may be transferred into effective dose(rate) E values, too. Normalisation may be done, as described above, on either the equivalent dose (rate) data or the effective dose (rate) data.

In an analogous way, the term clinical task may be varied if appropriate: all cine exposures may be one clinical task, but one could also differentiate between left ventricle studies, valve studies and coronary studies, if appropriate.

Relative regarding colleagues

Often the number the personnel in a room is limited to a few only, but in some cases up to almost 10 people may be inside the examination room. Instead of using a huge viewport on the display, a selective "top-3" will draw attention to those who might need more awareness.

Dr's often stand very close to the patient, and receive therefore much more dose than technical staff which takes more distance. In that respect, the measured values of people expected to stay at ample distance, and having the opportunity to stand behind lead-screens may be encouraged by giving them an appropriate reference of their received doses.

Furthermore, the way the dose meter or dose sensor is worn (on top or below the lead apron) may be taken into account, too.

Still further, the dose received may is linked with the use of shielding glass, the position of the person during X-ray ("take one step back") but is also strongly related to the way the examination apparatus is used.

Parameters which influence the dose exposure of the staff are, inter alia, the use of wedges and collimators, the gantry settings in terms of angulation, rotation SID, table positioning, the fluoro tastes selected ("low dose fluoro" or "high dose fluoro", "low frame speed exposures" or "high frame speed exposures").

Therefore, also these parameters may be used in the "normalisation process", but one may also choose to exclude (some of) them, just to show that they do influence the staff dose (unexpectedly).

Also linked to combining raw dose measuring data with technical X-ray apparatus system settings information may be:

a. The gained accuracy of the dose rates; by taking into account the system knowledge regarding beam quality (kV, added Cu filter, . . . ) The measuring device will be calibrated for the expected beam quality range, but very specific system info way improve the accuracy, or could even allow less sophisticated measuring device calibrations.

b. As the X-ray apparatus system knows when the examination did start and end, a cumulative staff dose pro patient/examination may be displayed too—for every user.

c. If several technicians or several Dr's may have participated in the same examination, it may be determined which one of them managed to keep the dose low.

FIG. 1 shows a display 200 of a dose awareness indication device. The display 200 comprises a dose indication region 201, a screen for viewing the object to be examined, such as, e.g. a coronary vessel-tree, and a control section 208 comprising control buttons.

The dose indication region 201 shows only the top 3 users, which are Dr. Jo, Dr. Ke and Nurse Zw.

It should be noted that a fluoro eye icon 207 is present (showing the type/mode of the examination) and/or a dashed line 206 which indicates what the 'good practise" level (should) be—for this specific cardio fluoro clinical task.

The bars 203, 204, 205 indicate the cumulative dose for this case, up to now, for Dr Jo, Dr. Ke and Nurse Zw, respectively.

It should also be noted that the values are shown during the X-ray examination, but that the "last" value, or the "maximal" or the "average" value (or any other smart representation of the last X-ray acquisition) may also be displayed between different X-ray exposures. In this way, the users may pay attention to the image while they do X-ray, while they can check their awareness indication later-on too. For extreme high (normalised) dose rates, a possibly unsafe behaviour may get extra attention with an appropriate signal/indication (e.g. by issuing an audible alarm signal) or a highlighted or blinking or colourful (red/white) dose awareness indication.

Note: stand alone meters may have an audible signal for extreme cases. However, this may only be functional if the absolute value is high. In other words, it may only work for imaging techniques which already have a very high equivalent dose level. Combining, or normalising would allow to give audible or other signals at techniques at a moderate absolute dose rate, which are expected to last for a long time, and in this way be dangerous.

Example: the nurse approaches—during the X-ray run—a patient for a kind of emergency, and forgets shielding and receives a dose rate which is comparable with the Dr's dose rate in worst case situations. A dedicated indication may in this case be very useful.

Display details: The number of blocks of the bars 203, 204, 205 (Dr. Jo has 8 blocks) may correspond to a linear or a logarithmic axis. The example of FIG. 1 is a logarithmic scale (it covers about 3 orders of magnitude). Every extra block indicates that the dose is twice as high.

In other words: Dr. Jo receives twice as much dose as commonly expected in fluoro (see dashed line); while Dr. Ke is having less than 10% of Dr. Jo: he/she is in a dose comfortable situation. The same is valid for Nurse Zw. The indication had the same references for Doctors and Nurses, and she is receives only 5% of what Dr. Jo receives. In this example, the nurse/technician did not get a dedicated scale.

Figure 2:
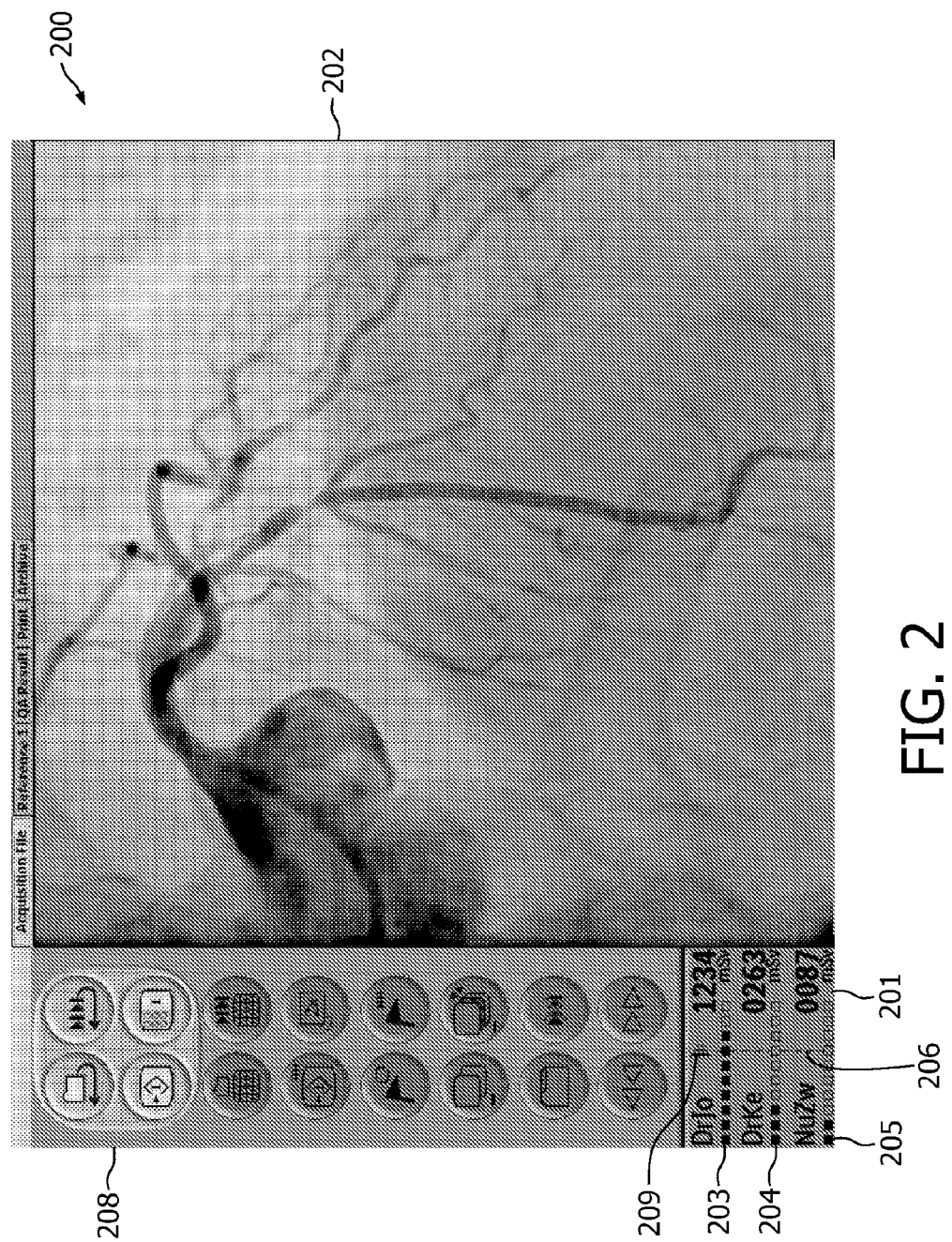
FIG. 2 shows a display for visualizing the individual dose data according to another exemplary embodiment of the present invention.

A similar situation exists in the case of exposures, as depicted in FIG. 2:

While for every staff member the dose rate is 10 times higher as during fluoro (see FIG. 1), everybody gets the same number of "awareness blocks": Every staff member (Dr. Jo, Dr. Ke, Nurse Zw) all stand in the same location as in the case of FIG. 1, they all have an identical dose-consciousness attitude, . . . and with the same "score", normalised differently— now for cine exposures. From icon 209 it can be seen, that the examination is a cine exposure.

Figure 3:
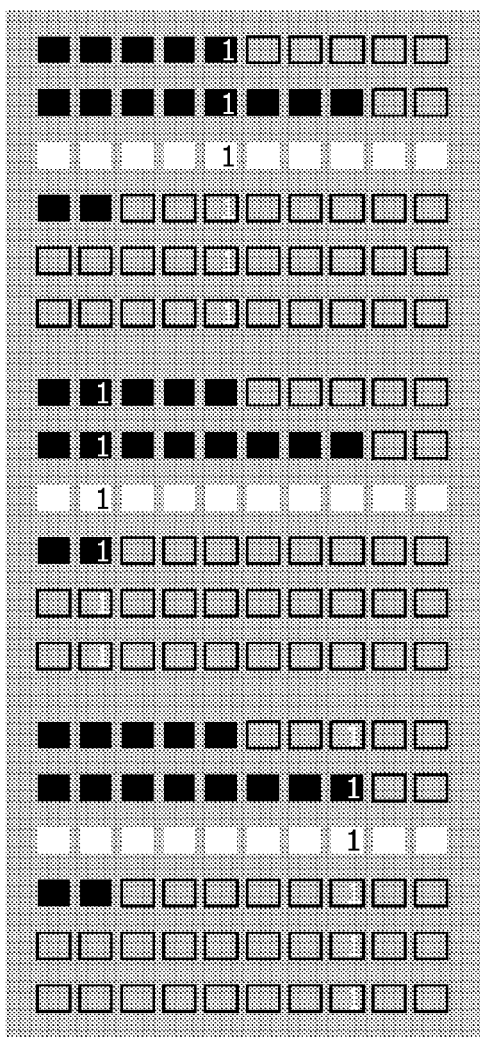
FIG. 3 shows a possible output of the device according to an exemplary embodiment of the present invention.

FIG. 3 shows a set of 18 examples of what an individual dose indication may look like for a particular user/staff member. White colour indicates a relative dose which is much too high with respect to the type of examination (clinical task) performed.

The column of numbers refers to the absolute dose in units of mSv/hour measured by the dose sensor. The second column indicates the type of examination, e.g. a typical gantry geometry (first line), a left anterior gantry geometry (second line, LAO), a left anterior gantry geometry of a thick patient (third line, LAO & thick patient), a right anterior gantry geometry of a thin patient (fourth line, RAO & thin patient), etc. The first six lines refer to cardio fluoro examinations, lines seven to 12 refer to cardio cine examinations and lines 13 to 18 refer to EP fluoro examinations.

The number "1" denoted the dose of one mSv/hour. As can be seen from FIG. 3, each of the 18 setups (lines 1 to 18) may show a different individual normalized accumulated dose.

Figure 4:
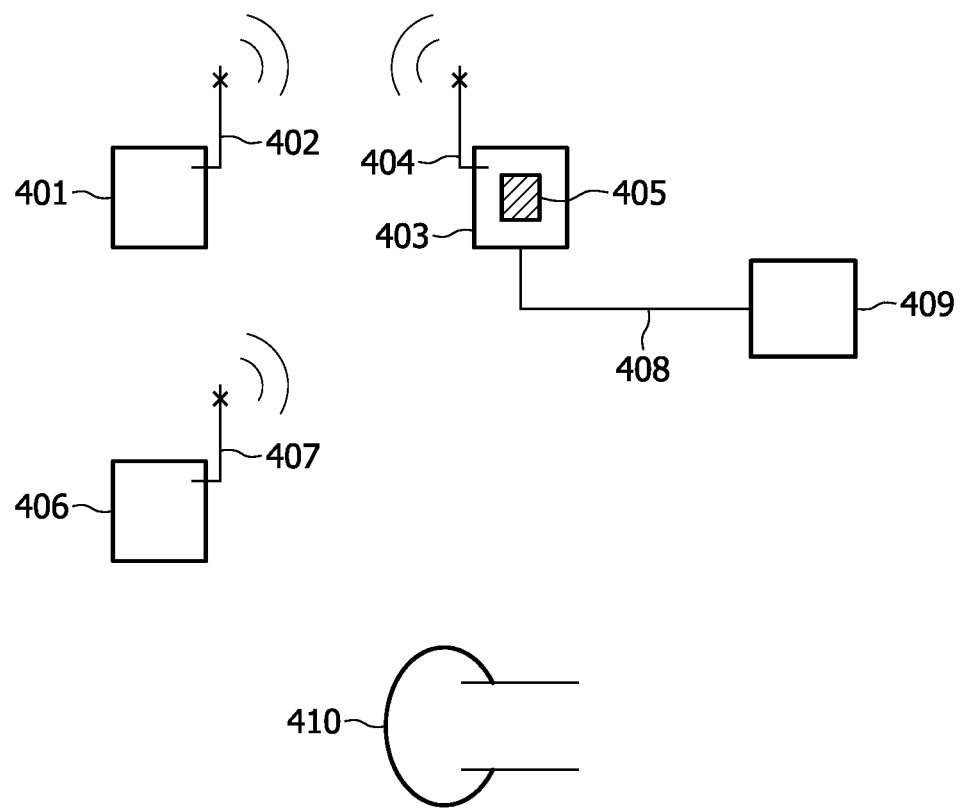
FIG. 4 shows an exemplary embodiment of the dose awareness indication device according to an exemplary embodiment of the present invention.

FIG. 4 shows a system according to an exemplary embodiment of the present invention. In the examination room, dose sensors 401, 406 detect x-ray doses emitted from an examination apparatus 410. The detection signal from the dose sensors 401, 406 may be transmitted via radio interfaces 402, 407, respectively and captured by a base station 403 via transmitter/receiver 404. The base station 403 is able (used) to display all measured dose rates from everybody in the room, at any time, via the display 405. When somebody new enters the room, he/she will be noticed an added to the list.

The base station 403 may be coupled to a monitoring station 409 via line 408.

The measured data from the base station 403 may be filtered by the Xper system, to gain accuracy if needed. For low dose applications, the relatively low sensitivity of the dose meter may be due to statistical variations.

For "long lasting runs", the running average, or any other temporal filter to the signal may be use to get ride of the inherent noise of the staff dose signal.

The base station may typically measure only (about) once every second. For short runs (4 seconds is common), the average dose rate signal may be undersampled. Therefore, the measurement rate may be increased in these case, for example automatically. As the state-of the-art cardio-vascular (or other modality) system knows the exact X-ray run duration, and the dose meter knows the exact amount of extra accumulated dose, the dose rate may be calculated with more accuracy.

The present invention may be used for all rooms where X-rays are been used, and where end-users are required to wear dose batches, and where dose awareness makes sense.

It should be noted that the term "comprising" does not exclude other elements or steps and the "a" or "an" does not exclude a plurality and that a single processor or system may fulfill the functions of several means or units recited in the claims. Also elements described in association with different embodiments may be combined.

It should also be noted, that any reference signs in the claims shall not be construed as limiting the scope of claims.

The invention claimed is:

1. A dose awareness indication device for determining an individual dose data of a plurality of staff members during a diagnostic or interventional x-ray examination or clinical task of an object of interest with an examination apparatus, the device comprising:
   a plurality of personal dose sensors for providing raw dose measuring data, wherein the plurality of personal dose sensors are activated within a predetermined range from the examination apparatus, wherein the plurality of personal dose sensors operate in real-time, and wherein the plurality of staff members each have a role in the examination;
   a determination processor for determining the individual dose data in real time on the basis of the raw dose measuring data received from the plurality of personal dose sensors and information data received from the examination apparatus;
   wherein the information data from the examination apparatus identifies the kind of examination and at least one examination parameter selected from the use of wedges and collimators, gantry settings including angulation, rotation SID, and table positioning, the fluoro taste including low dose, high dose, low frame speed, and high frame speed, beam quality including kV and added filter, and examination start and end;
   wherein the determination processor is configured to set a threshold value on the basis of the kind of examination, the at least one examination parameter, and the roles of the individual staff members; and
   wherein the threshold value is set differently for individuals of the plurality of staff members.

2. The device of claim 1, wherein the determination processor is further configured for performing a normalization of the individual dose data on the basis of predetermined exposure values for the clinical task.

3. The device of claim 1, wherein the examination is cardio fluoro, cardio cine, vascular fluoro, pediatric fluoro, EP fluoro, cardiac exposure, vascular DSA exposure, a rotational scan, a left ventricle study, a valve study, or a coronary study.

4. The device of claim 1, further comprising:
   a display for visualizing the individual dose data including accumulated dose data, actual staff dose data compared to predetermined or expected values for the clinical task, or compared to other staff persons present in the same clinical task, wherein the display is configured to display cumulative dose, last value, and average value for selected individuals of the staff or the entire staff, and wherein the display has a dose indication region, a screen for viewing an object to be examined, a control section, a fluoro eye icon, and a marker showing a predetermined threshold for the clinical task.

5. The device of claim 1, further comprising:
   a receiver for receiving the raw dose measuring data from one or more personal dose sensors via a wireless communication link.

6. The device of claim 1,
   wherein the determination processor sets a measurement frequency of the dose sensor on the basis of the kind of examination, or wherein the measurement frequency is set on the basis of the accumulated dose and run duration, and the measurement frequency ranges from a plurality of measurements per second to one per minute.

7. The device of claim 1,
   further configured for triggering an alarm if the individual dose data exceeds the threshold value.

8. The device of claim 1, wherein one or more of the plurality of personal dose sensors are worn by each of the individual staff either above a lead apron, below a lead apron, or both above and below a lead apron.

9. A method for making a plurality of staff members aware of an X-ray dose during a diagnostic or interventional X-ray examination or clinical task of an object of interest with an examination apparatus, the method comprising:
   providing a plurality of personal dose sensors operating in real time and worn by the a plurality of staff members for providing raw individual staff dose data, wherein the plurality of staff members each have a role in the examination;
   activating the plurality of personal dose sensors within a predetermined distance from the examination apparatus;
   operating a determination processor for receiving the raw individual staff dose data from the plurality of personal dose sensors and determining the individual staff dose data in real time on the basis of the raw individual staff dose data and information data received from the examination apparatus;
   wherein the information data from the examination apparatus identifies the kind of examination and at least one parameter selected from the use of wedges and collimators, gantry settings including angulation, rotation SID, and table positioning, the fluoro taste including low dose, high dose, low frame speed, and high frame speed, beam quality including kV and added filter, and examination start and end;
   normalizing the individual staff dose data with the determination processor on the basis of predetermined values for the clinical task;

displaying a visualization of the individual staff dose data including accumulated dose data and actual staff dose data compared to predetermined or expected values for the clinical task, or compared to other staff persons present in the same clinical task;

operating the determination processor to set a threshold value on the basis of the kind of examination, the at least one examination parameter, and the roles of the individual staff members, and setting the threshold value differently for individuals of the plurality of staff members.

10. The method of claim 9, further comprising operating the determination processor to set a measurement frequency of the dose sensor on the basis of the kind of examination, or wherein the measurement frequency is set on the basis of the accumulated dose and run duration, and the measurement frequency ranges from a plurality of measurements per second to one per minute.

11. The method of claim 9, further comprising triggering an alarm if the individual staff dose data exceeds the threshold value.

12. A computer program product comprising code instructions stored in a non-transitory tangible computer readable medium, wherein the instructions carry out the method:

operating in real time a plurality of personal dose sensors worn by a plurality of staff members for providing raw individual staff dose data, wherein the plurality of staff members each have a role in the examination;

activating the plurality of personal dose sensors within a predetermined distance from the examination apparatus;

operating a determination processor for receiving the raw individual staff dose data from the plurality of personal dose sensors and determining the individual staff dose data in real time on the basis of the raw individual staff dose data, information data received from the examination apparatus, and the roles of the individual staff members;

wherein the information data from the examination apparatus identifies the kind of examination and at least one parameter selected from the use of wedges and collimators, gantry settings including angulation, rotation SID, and table positioning, the fluoro taste including low dose, high dose, low frame speed, and high frame speed, beam quality including kV and added filter, and examination start and end;

normalizing the individual staff dose data with the determination processor on the basis of predetermined values for the clinical task;

displaying a visualization of the individual staff dose data including accumulated dose data and actual staff dose data compared to predetermined or expected values for the clinical task, or compared to other staff persons present in the same clinical task.

\* \* \* \* \*